United States Patent [19]

Voegtlin

[11] Patent Number: 4,782,214

[45] Date of Patent: Nov. 1, 1988

[54] INDIRECT-HEATING TRUCK-TYPE BAKERY OVEN

[76] Inventor: Rene Voegtlin, 2, rue de la Colline, Oberhausbergen, 67200 Strasbourg (Bas-Rhin), France

[21] Appl. No.: 8,173

[22] Filed: Jan. 29, 1987

[30] Foreign Application Priority Data

Feb. 5, 1986 [FR] France .................... 86 01667

[51] Int. Cl.⁴ .................... H05B 3/62; A21B 1/24
[52] U.S. Cl. .................... 219/401; 219/400; 126/21 A
[58] Field of Search ............ 219/400, 401; 126/21 A, 126/21 R, 20, 20.1, 20.2; 34/195, 196, 197, 215, 218, 219, 224, 225, 232, 233, 235

[56] References Cited

U.S. PATENT DOCUMENTS

| | | | |
|---|---|---|---|
| 1,523,509 | 1/1925 | Braemer | 34/196 |
| 1,601,966 | 10/1926 | Harris | 34/224 |
| 2,048,749 | 7/1936 | Lydon | 219/400 |
| 2,318,027 | 5/1943 | Sykes | 34/196 |
| 2,370,422 | 2/1945 | Reed | 34/196 |
| 3,518,949 | 7/1970 | Stock | 219/401 |
| 3,682,643 | 8/1972 | Foster | 219/405 |
| 3,705,461 | 12/1972 | Parkes | 34/219 |
| 3,738,019 | 6/1973 | Forg | 34/225 |
| 4,559,903 | 12/1985 | Bloom | 34/233 |

Primary Examiner—H. Broome
Assistant Examiner—Teresa J. Walberg
Attorney, Agent, or Firm—Sandler & Greenblum

[57] ABSTRACT

This indirect-heating, truck-type bakery oven includes a baking chamber closed by a charging door opening throughout the surface of this door, a re-circulation channel provided with a turbine-type fan and heater for heating the cooled air from the baking chamber, and a manifold having louvres for introducing hot air streams into the baking chamber and a steam generator. The steam enclosed in the baking chamber being quickly exhausted, at the end of the baking cycle and before opening the charging door, by creating an exhaust current on the one hand by use of a flow of external air blown through vents taking air from the surrounding external atmosphere in the lower portion of the heating chamber for replacing the steam contained in this chamber and, on the other hand, by extracting this steam through a port formed in the upper portion of the baking chamber by means of a turbine-fan, by sucking and subsequently blowing the steam through exhaust vents, the vents for introducing external air and the steam exhaust vents cooperating with each other and being actuated simultaneously by power controls.

25 Claims, 1 Drawing Sheet

INDIRECT-HEATING TRUCK-TYPE BAKERY OVEN

FIELD OF THE INVENTION

The present invention relates on the one hand to an indirect-heating truck-type bakery oven comprising a baking chamber closed by a charging door opening completely the access to this chamber, a re-circulation channel equipped with a turbine-type fan and with means for heating the cooled air from said baking chamber, a manifold comprising louvres for introducing hot air streams into said baking chamber and a steam generator, and on the other hand to a method of blowing off the steam from the oven.

THE PRIOR ART

In the present state of the art baking ovens with charging trucks (namely trucks for placing dough loaves or the like in the oven) are well known for baking all kinds of bread, crescents, pastry and similar products, these ovens comprising a charging door opening completely the access to the baking chamber. Thus, the charging truck, consisting essentially of a rolling ladder supporting a plurality of superposed trays carrying the products to be baked, is adapted to be introduced in or removed from the baking chamber through said charging door.

The charging truck either remains in a fixed position throughout the baking process, or is rotated at a very low speed about its vertical axis during this process. In either case, hot air streams issuing from a manifold provided with suitable louvres or slits is blown between the trays carrying the products to be baked, the regularity of the baking process being improved by this rotary motion throughout the generally rectangular trays.

In addition to the means for generating the heat required for baking the products, the bakery oven must comprise means for generating and exhausting steam. In fact, when baking bread, the baking chamber must be filled with steam immediately after placing the bread loaves or like dough products in the chamber. This steam, by condensing on the still cold loaves, will thus delay the dehydration of the skin of the products to be baked under the influence of heat, during the initial phase of the baking process. This initial phase consists in increasing the volume of the products to be baked, as a consequence of the inner thrust exerted by the leaven. By delaying the formation of the external crust, a kind of elastic skin is preserved on the products during a few minutes, thus causing these products to undergo an optimal volumetric expansion and counteracting any tendency to develop undesired cracks.

As a rule, this steam is obtained by either causing water to flow on metal surfaces disposed inside the baking oven and heated preliminarily by the hot air circuit, or sprinkling water directly into the hot air re-circulation circuit by means of adequate injection nozzles.

To prevent the occurrence of undesired overpressure when filling the baking chamber with steam, this chamber is provided as a rule with a dipper tube having an open lower end adjacent the floor. This dipper tube is connected to a steam exhaust conduit generally referred to as the steam eduction pipe. When steam is supplied to the baking chamber, the air contained initially in the baking chamber may be blown out through the lower opening of the dipper tube. If desired this dipper tube may also exhaust the excess steam possibly generated while maintaining a steam-filled bell in the baking chamber.

A few minutes after the initial phase of the volumetric expansion and temperature increment of the products, these are baked and loose from fifteen to thirty percent of their initial dough weight as a function of the particular nature of the products and also of the desired end result. This loss of weight is attended by the release of steam throughout the baking chamber, and this steam must be exhausted by all means.

If the products are to be baked in a wet atmosphere, the lower opening of the dipper tube may prove sufficient for exhausting the steam released by the products. On the other hand, if these products are to be baked in a less saturated atmosphere, the bakery ovens must be provided with a steam exhaust ear connected to the steam exhaust conduit, this ear consisting of a hole formed through the ceiling of the baking chamber and associated with a valve adapted to be opened during the final phase of the baking process.

When the products are baked to a turn, this condition being generally evidenced by a sound signal emitted by a timer at the end of the baking cycle, the operator must open the charging door which closes completely the baking chamber, and then remove the truck from the oven.

At that time, the baking chamber is filled completely with steam, even if the steam exhaust valve connected to the steam exhaust conduit has been fully opened. In fact, since no air input is provided for replacing the exhausted steam, the valved ear can discharge only the excess steam released by the products as they loose weight, not the normal volume contents of the baking chamber.

In addition, the maximum amount of steam released by the products is attained at the end of the baking process, even if the heating was turned off. In fact, turning off the heating means cannot affect the baked products because at the end of the baking process these products have reached their maximal heat-absorption capacity.

For the various reasons set forth hereinabove, a mass of steam corresponding to several cubic meters breaks forth instantaneously from the bakery oven when the charging door is opened for removing the charging truck.

This sudden steam outbreak may prove extremely dangerous for the operator who might experience serious burns. Besides, these repeated steam outbreaks from the inner space of the bakery oven, during successive drawings of break from the oven, are also very noxious to the walls and ceiling of the bakehouse.

The consequences of these nuisances are also aggravated when the bakery oven is installed in a bakery show-window where the bread or other products are baked publicly.

Conventionally, bakers endeavor to palliate these inconveniences by disposing a canopy above the charging door of the bakery oven, this canopy being connected to a ventilated steam exhaust conduit. However, in most cases these canopies are inefficient. In fact, on the one hand their steam collecting action is poor because their lower edge is compulsorily disposed above the level of the head of the baker or operator who must be able to open and close the charging door of the bakery oven, the lower edge of this door being more or less at floor level, and on the other hand it is almost impossible to install a hood or canopy having the volumetric capacity of absorbing the instantaneous outburst of this huge amount of steam.

Under these conditions, the operator is advised to firstly open the charging door very cautiously and slowly so that during a suitable time period the steam can escape very gradually, whereafter the door is opened completely. However, this method is rather empirical and serious casualties have been reported in many cases, due chiefly to human lapses.

Now it is the essential object of the present invention to avoid these inconveniences.

SUMMARY OF THE INVENTION

For this purpose, the present invention provides a method of exhausting steam from a bakery oven, this method being characterised by the fact that at the end of the baking process the volume of the baking chamber in the bakery oven is replaced several times by air taken from the surrounding atmosphere between the moment the baking time is up and this volume is filled with steam, and the release of a signal giving notice of the steam outburst and the possibility of opening the charging door without any risk.

This invention is also directed to provide an indirect-heating truck-type bakery oven comprising a baking chamber closed by a charging door opening completely the ingress to said chamber, a re-circulation channel provided with a turbine-type fan and means for heating the cooled air from said baking chamber, a manifold provided with louvres for introducing hot air streams into the baking chamber, and a steam generator, this bakery oven being characterised in that it comprises means for quickly exhausting the steam contained in the baking chamber at the end of the baking process, before opening the charging door, by generating an exhaust current obtained on the one hand from a flow of external air blowing through released air intake means disposed at the bottom of the baking chamber so as to replace the steam contained in this chamber, and on the other hand by exhausting through an outlet provided in the upper portion of the baking chamber, by means of a turbine fan, by suction and blowing the steam exhausted through the exhaust means, said intake means for the external air and said exhaust means cooperating with each other and being controlled simultaneously by power means.

The present invention will now be described more in detail with reference to the attached drawing illustrating diagrammatically a typical and exemplary form of embodiment of the invention.

THE DRAWING

FIG. 1 is a front elevational and fragmentary sectional view of a bakery oven comprising a steam exhaust device according to the present invention.

DESCRIPTION OF THE PREFERRED EMBODIMENT

Figure 1:
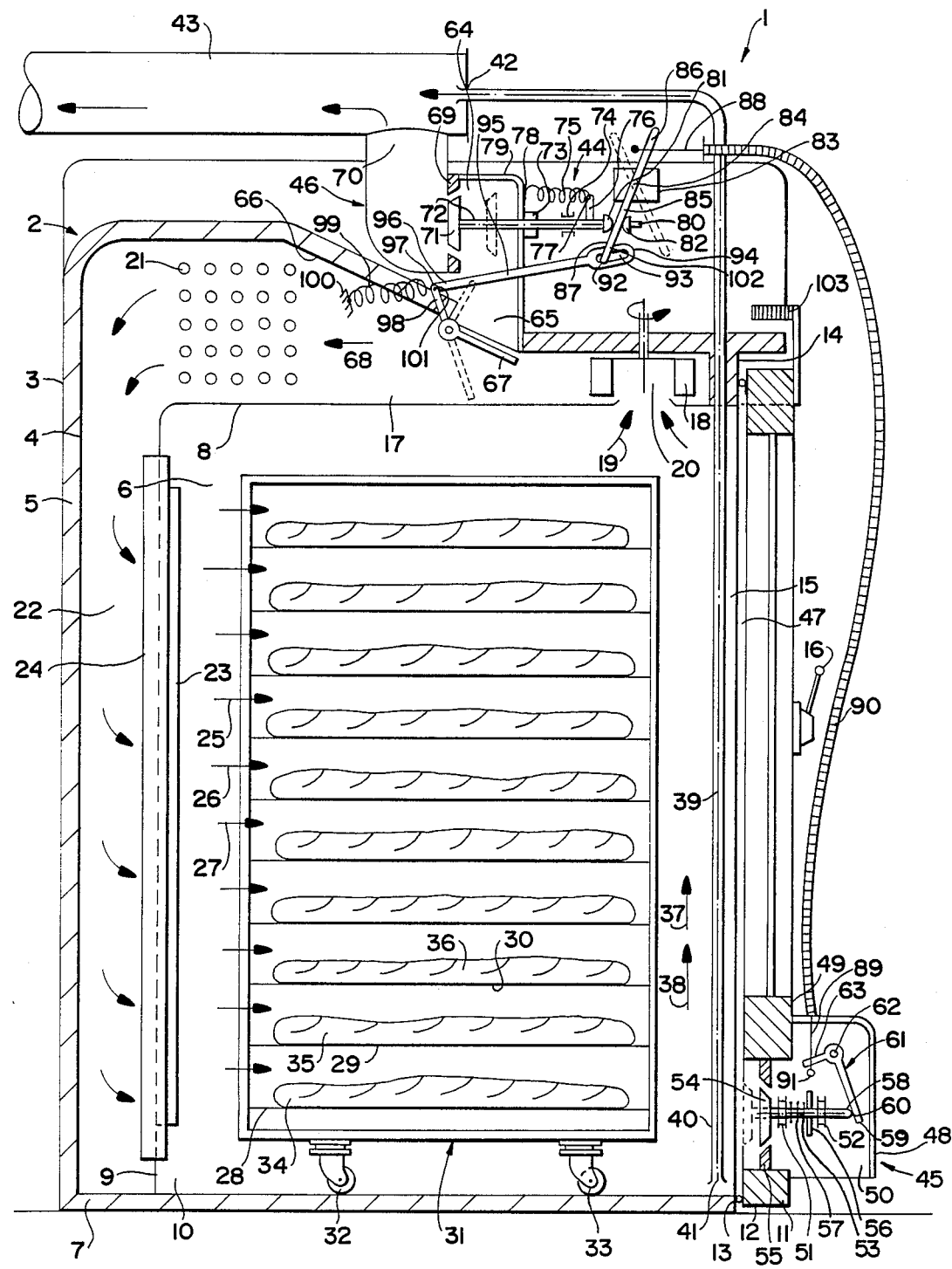

The bakery oven 1 is enclosed in a housing 2 consisting of an outer wall 3 and an inner wall 4 between which heat insulating material 5 is disposed. This bakery oven 1 comprises a baking chamber 6 defined at the bottom by a floor 7, at the top by a ceiling 8, and also by a rear wall 9, a pair of opposite lateral walls 10 and a front charging door 11. This door 11 comprises on its inner surface 12 a peripheral sealing gasket 13 adapted to be pressed for fluid-tight engagement against the dormant frame 14 of the front aperture 15 of baking chamber 6. The charging door 11, of same width as said front aperture 15, comprises a control handle 16 for actuating the door lock, (not shown) of any suitable type.

Overlying the ceiling 8 is a re-circulation channel 17 provided with a fan 18 of which only the turbine is shown. The cooled air 19 is sucked by this turbine through an air intake 20 formed in the ceiling 8. The fan 18 forces this air through heating means 21.

These air heating means 21 consist, according to a first form of embodiment, of a battery of electric heating resistances or, in a second form of embodiment, of a heat exchanger heated by a burner supplied with gaseous or liquid fuel.

The hot air blown through the heating means 21 is directed toward a manifold 22 disposed behind the rear wall 9 and connected to the steam generator 24 through a pair of vertical blowing louvres or slits 23 disposed on either side of a steam generator 24.

The hot air streams 25, 26, 27 blown through the vertical louvres or slits 23 and providing the necessary baking heat are directed between the trays 28, 29, 30 of a truck 31 consisting of a rolling ladder mounted on casters 32, 33. The trays 28, 29, 30 supported by the truck 31 are loaded with the products 34, 35, 36 to be baked. These products are shown by way of example, not of limitation, in the form of elongated loaves for making bread, but of course any other bakery articles such as fancy bread, crescents, pastry and the like can be baked in this oven.

In a first form of embodiment the truck 31 is held in a fixed position throughout the baking process.

In a modified form of embodiment, the truck 31 is rotated at a relatively slow rate about its vertical axis. This movement of rotation intended for assisting in the regular and uniform baking of the products, irrespective of their position on the rectangular rotary tray 28, 29, 30, is obtained either by providing a rotary platform (not shown) incorporated in or supported by the floor 7, or by means of a hook (not shown) rotatably driven by a motor and suspended from the ceiling 8, the truck 31 being suspended and locked automatically in turn to this hook when the truck is pushed into the baking chamber 6.

After passing through the truck 31 between the trays 28, 29, 30 and contacting the products 34, 35, 36 to be baked, the heat-impoverished air streams 37, 38 are sucked by the fan turbine 18 through the intake port 20 and the cycle is resumed.

When the temperature of the baking oven 1 has risen sufficiently to attain the baking temperature, the truck 31 is introduced in the baking chamber 6. Then the charging door 11 is closed and locked and the baking cycle is started. This cycle starts when the baking chamber 6 is filled with steam generated by the steam generator 24 while water is caused to flow on the surfaces of this chamber previously heated by the hot air re-circulation.

This steam condensates mainly on the skin of the products to be baked 34, 35, 36, thus delaying the building up of the crust while maintaining this skin in an elastic condition during several minutes, so that the products submitted to the baking cycle will expand until they attain their optimum volume without developing undesired cracks or breaking the final crust.

The baking chamber 6 comprises a dipper tube 39 of which the lower end adjacent the floor 7 has an opening 41, the upper end 42 of this tube 39 opening into a steam exhaust conduit 43. As the steam flows through this chamber, the air contained therein is forced through the opening 41 of dipper tube 39. Similarly, the excess steam possibly generated may also be exhausted through this opening 41 while maintaining the bell consisting of this baking chamber 6 filled with steam during the time period in which the elongated loaves shown in the drawing keep absorbing damp vapor.

As a consequence of the heating and upon completion of the expansion of the loaves up to their maximal volume, the baking phase of these loaves begins. These elongated loaves loose a fraction of their dough weight in the form of vapor.

If for instance the products to be baked consist of elongated loaves, they will lose about one-fourth of their initial weight during the baking phase. The baking chamber 6 is substantially at the atmospheric pressure, except for minor variations due to the re-circulation fan, and the products to be baked release their steam contents at a temperature of about 100° C. The elongated loaves, taken by way of example as the products to be baked, can withstand baking in a slightly wet atmosphere and during this baking phase the amount of steam exhausted through the opening 41 of dipper tube 39 is sufficient.

In contrast thereto, the steam flowing through the steam exhaust conduit 43 is superheated steam, since, for baking elongated loaves, the baking temperature of the bakery oven should lie preferably in the range of 250° to 300° C.

When the imter (preset as a function of the desired baking time) has completed its cycle, the products are suitably baked. The heating means 21 are turned off, and, if necessary, the rotation of truck 31 is stopped so that this truck 31 will present itself in the proper position for its removal from the oven. Now the baking chamber 6 is filled completely with steam, this filling being strongly assisted by the cooling off of the products of which the steam release has now reached its maximal degree.

The method of the present invention is carried out between the time corresponding to the end of the baking process and the time the charging door 11 of the bakery oven 1 is opened for removing the truck 31 therefrom. According to this method, the atmosphere of baking chamber 6 is renewed several times with air taken from the atmosphere surrounding the baking oven 1, this renewal taking place in a relatively short time.

For this purpose, a quick-action device 44 is used for exhausting the steam enclosed or trapped in the baking chamber 6. This device 44 comprises air intake means 45 and steam exhaust means 46.

The air intake means 45 are advantageously disposed in the lower portion of baking chamber 6 and more particularly at the bottom of charging door 11, the upper portion 47 being preferably glazed so that the baker can watch the baking in progress. Of course, these air intake means 45 may also be disposed in the lower portion of the rear wall 9 or anyone of the lateral walls 10 of the bakery oven 1.

The air intake means 45 further comprise a casing 48 secured to the front surface 49 of the charging door 11. This casing 48 has a bottom aperture 50 permitting the ingress of air taken from the surrounding atmosphere, and encloses a pair of guide sockets 51, 52 through which the shank 53 of an induction valve 54 is slidably engaged. This induction valve 54 is associated with a valve seat 55 formed in the charging door 11. The valve shank 53 comprises a shoulder 56. Disposed between this shoulder 56 and the guide socket 51 is a resilient member 57 constantly urging the induction valve 54 to its closed or seated position during the baking process, the necessary fluid-tightness being provided by the seal between the valve 54 and its seat 55.

The free end 58 of the shank 53 of induction valve 54 abuts the free end 59 of one of the arms 60 of a bell-crank lever 61 fulcrumed to a pivot pin 62 having its other arm 63 coupled to one end of one of the actuating means to be described presently.

The steam exhaust means 46 comprise an exhaust chamber 64 connected to the baking chamber 6 via an aperture 65 formed in the top 66 of re-circulation channel 17. This aperture 65 may be closed by a switch flap valve 67 fulcrumed on a pivot pin 68. During the baking cycle, this switch flap valve 67 engages the top aperture of re-circulation channel 17 and thus the turbine of fan 18 forces its output air for baking purposes towards the heating means 21, said switch flap valve 67 being unseated during the steam exhaust phase. In this position the switch flap valve 67 closes the re-circulation channel 17 and the turbine of fan 18 forces its output air towards the exhaust chamber 64. With this fan turbine 18 an upper ventilation is created in exhaust chamber 6. However, when actuated this exhaust switch flap valve 67 does not close completely the aperture 65.

The steam exhaust chamber 64 is also connected via a valve seat 69 to an exhaust pipe elbow 70 leading to the steam exhaust conduit 43.

During the baking process, the steam exhaust means are closed in a fluid-tight manner by an exhaust valve 71 cooperating with valve seat 69. This valve 71 has a valve shank 72 adapted to slide in a packing-box 73 and a guide bearing 74. This exhaust valve 71 is normally urged against the valve seat 69 by a resilient return element 75 having one end 76 attached to a stud 77 secured to the valve shank 72 and the other end 78 anchored to the wall 79 of exhaust chamber 64. The valve shank 72 comprises at its free end 80 a pair of shoulders 81, 81 between which one of the driving members is disposed.

The drive or power means comprise a servomotor 83. Keyed to the output shaft 84 of servomotor 83 is a main control lever 85 of which the two outer ends 86, 87 are adapted to describe circular arcs about the axis of shaft 84 of servomotor 83. The upper end 86 of main control lever 85 is coupled to one end 88 of a Bowden-type cable 89 enclosed in a flexible sheath 90 and having its other end connected to one arm 63 of bell-crank lever 61 of the above-described air intake means 45.

The other end 87 of the main control lever 85 carries a coupling pin 92 engaging an elongated hole 93 formed in one end 94 of a rod 95 having its other end 96 connected by a pivot pin 97 to another lever 98 rigidly coupled to the switch flap valve 67. The purpose of the elongated hole 93 is to introduce a certain backlash in the movement of the end 87 of main control lever 85. The switch flap valve 67 controlling the opening 65 is normally urged to its closed position by a return spring 99 having a fixed end 100 and its other end 101 attached to the arm 98 of switch flap valve 67.

The valve shank 72 extends between the arm 87 of the main control lever 85 and the shaft 84 of servomotor 83, so that the arm 102 of said lever 85 is disposed between the shoulders 81 and 82 of valve shank 72.

At the end of the baking process, the servomotor 83 controlled automatically at the end of the cycle by the timer setting the baking time rotatably drives via its output shaft 84 the main control lever 85. The resulting angular movement of this lever 85 causes its arm 86 to pull the cable 89 so that the opposite end of this cable 89 will pull in turn the arm 63 of bell-crank lever 61. Thus, this lever 61 is pivoted about its fulcrum pin 62 and its other arm 60 depresses the valve shank 53, thus unseating the valve 54 and permitting the flow of external air through the valve seat 55, as shown in dash lines in the Figure.

During the rotation of the main control lever 85 the arm 87 thereof moves freely in the rod 95 as a consequence of the elongated hole 93 formed in said rod, without driving the latter. On the other hand, the arm 102 of said main control lever 85 pulls the shoulder 82 and consequently the valve 72, so that the exhaust valve 71 is unseated and moved to the position shown in dash lines in the Figure, the valve seat 69 is released and the steam trapped in exhaust chamber 64 can escape. With this arrangement, both valves 54 and 71 are opened before the switch flap valve 67.

When the pin 92 connecting the end 87 of control lever 85 eventually engages the edge of elongated hole 93, the control lever 85 exerts a tractive effort on rod 95, thus moving the switch flap valve 67 to the position shown in dash lines in the Figure. Under these conditions, the steam trapped in baking chamber 6 is exhausted by the turbine and replaced by external air penetrating through the valve seat 55. This steam is forced through the open valve seat 65, the exhaust chamber 64, the open valve seat 69, the exhaust channel 70 and the exhaust conduit 43.

The flow of external air also carries along the sweating from the products releasing a maximal amount of steam at this time.

At the end of a exhaust period corresponding to several renewals of the air filling the inner volume of baking chamber 6 with fresh air taken from the surrounding atmosphere, no steam is left in the inner space of the bakery oven 1. This exhaust time, controlled by any suitable preset timer (not shown), is extremely short due to the relatively high output of the turbine-type fan 18. The end of the time-lag, which corresponds to the end of the steam exhaust phase, is brought to the operator's attention by a sound and/or optical signal.

To avoid any wrong move, the said timer may be arranged for controlling likewise the lock mechanism of charging door 11.

Thus, the operator may open this door without any risk of undesired release of steam from the oven, and the truck 31 can safely be removed from the oven.

When the charging door 11 is closed again, a limit switch 103 will control the motor or power means. Thus, the resilient member 57 will urge the induction valve 54 to close the air intake, the other resilient member 75 will urge the exhaust valve 71 to prevent the exhaust of steam and the return spring 99 will move the switch flap valve 67 to close the aperture 65 and clear the re-circulation channel 17.

In a modified form of embodiment, the main control lever 85 is actuated manually but automatic control means incorporating a servomotor 83 is preferred for actuating this lever 85. In case of manual control the lever 85 is fulcrumed on a pivot pin 84.

When it is desired to bake pastry, crescent rolls or similar products, the baking process differs slightly from the one described hereinabove which refers essentially to elongated breads or loaves. Thus, in the particular case of crescent-rolls, the baking chamber 6 is not filled initially with steam. During the baking process, the crescents must be prevented from being baked in an excessively wet atmosphere. Most known bakery ovens are provided for this purpose with a steam exhaust port formed through the ceiling of the baking chamber 6 and connected to the steam exhaust conduit 43 in order to evacuate the steam released or 'sweated' by the products during the baking process. In an oven provided with the above-described steam exhaust device 44 according to the present invention, it is unnecessary to provide this steam exhaust port, since this function can be performed very satisfactorily by the quick-action exhaust device 44 during the baking operation. For this purpose, the main control lever 85 is set in an intermediate position (with respect to its two end positions shown in the Figure).

In this intermediate position, the exhaust valve 71 remains partly open as long as no action is exerted on the switch flap valve 67 (due to the blacklash provided between the coupling pin 92 and the elongated hole 93 of rod 95), or on the induction valve 54 (by providing an extra length at the end 88 of cable 89).

As mentioned hereinabove, the switch flap valve 67 does not close completely in its two operative positions. Thus, the exhaust valve 71 may operate as a means for exhausting sweat or steam when the switch flap valve 67 is in its upper, re-circulation position, whereas when this switch flap valve 67 is in its lower position it allows a slight re-circulation leakage output, a feature rather advantageous as far as the electric heating resistances are concerned. In fact, it is undesirable that the ventilation be stopped immediately and completely when the supply of current to these resistances is switched off.

According to another possible form of embodiment, the Bowden-type cable and sheath assembly 89, 90 connecting the main control lever 85 to the induction valve 54 may be replaced by an electrical connection by coupling a separate servomotor to said induction valve 54.

According to another possible form of embodiment, a suitable linkage mechanism may be substituted for this cable 89 and its sheath 90.

Furthermore, a flexible hydraulic sheath may be substituted for said cable 89, said flexible hydraulic sheath being provided at its end connected to said main control lever 85 with a hydraulic cylinder and to the induction valve 54 via a slave cylinder.

In another possible form of embodiment an auxiliary fan may be associated with a ventilation inlet aperture formed in the ceiling of baking chamber 6 and provided with an exhaust valve for exhausting the steam from the oven by renewing its atmosphere with air taken from the surrounding atmosphere through air intake means 45 provided with an induction valve 54. Under these conditions, the re-circulation heating fan is no more utilized for exhausting steam from the oven and the switch flap valve 67 may be dispensed with.

I claim:

1. A truck-type bakery oven for baking, said oven comprising:
   (a) a baking chamber having an access opening on a first side of said chamber, said chamber further comprising a door for selectively closing said opening;

(b) means for recirculating air from said chamber, said recirculating means comprising a recirculation channel and a turbine-type fan;

(c) means for heating relatively cool air from said baking chamber, said heating means being located in said channel, said channel being located exteriorly of said baking chamber and within said oven;

(d) a second side of said chamber comprising a manifold having a plurality of vertical louvres, said manifold comprising means for introducing streams of hot air into said baking chamber from said recirculation channel;

(e) a steam generator positioned in said manifold;

(f) means for rapidly exhausting steam from an upper portion of said chamber and for conducting said steam outwardly from said oven, at the end of a baking cycle, while said door is closed;

(g) means for drawing fresh air directly into a lower portion of said baking chamber from outside of said oven; and (h) means for actuating said steam exhausting means and said fresh air drawing means in a coordinated manner.

2. A truck-type bakery oven in accordance with claim 1, wherein the height and width of said first side of said baking chamber.

3. A truck-type bakery oven in accordance with claim 1, wherein said air drawing means comprises:
(a) an induction valve having a shank attached, said shank being slidably mounted in guide bearings and activated by said operating means;
(b) an induction valve seat complementary in configuration to said induction valve for selectively maintaining said fresh air drawing means in an open or closed position; and
(c) a housing that is attached to a bottom portion of an external surface of said door, said fresh air drawing means being mounted within said housing.

4. A truck-type bakery oven in accordance with claim 3, wherein said shank comprises a shoulder for retaining a resilient return member positioned between said shoulder and one of said guide bearings.

5. A truck-type bakery oven in accordance with claim 1, wherein said steam exhausting means comprises an exhaust chamber having a first end and a second end, said first chamber end being fluidically connected to said baking chamber through an aperture in a top portion of said recirculation channel, and said chamber second end being connected to an exhaust elblow by an interconnecting valve seat, said exhaust elbow opening into a steam exhaust conduit.

6. A truck-type bakery oven in accordance with claim 5, wherein said exhaust chamber comprises an exhaust valve having an exhaust valve shank slidably mounted in a holder assembly and in a guide bearing, said exhaust valve shank being attached to means for actuating said exhaust valve.

7. A truck-type bakery oven in accordance with claim 6, wherein said exhaust valve shank comprises a resilient return member having a first end and a second end, and a lateral projection, said lateral projection being attached to said resilient return member first end, said resilient return member second end being attached to a fixed exterior wall of said exhaust chamber, said exhaust valve shank further comprising two shoulders, said actuating means being positioned between said shoulders.

8. A truck-type bakery oven in accordance with claim 1, wherein said steam exhausting means comprises a moveable flap biased by a resilient member into a normally closed position, said flap being adapted to pivot about a pin, when actuated, to move between closed and open positions.

9. A truck-type bakery oven in accordance with claim 8, wherein when said flap is in said closed flap position, said flap substantially closes an inlet aperture of said exhaust chamber, and when said flap is in said open position said flap substantially closes one end of said recirculation channel.

10. A truck-type bakery oven in accordance with claim 8, further comprising a main control lever having first and second ends, said second end of said main lever being operatively connected to means for positioning said flap.

11. A truck-type bakery oven in accordance with claim 10, wherein said positioning means comprise means for delaying movement of said flap for a predetermined time with respect to movement of said induction valve and said exhaust valve.

12. A truck-type bakery oven in accordance with claim 11, wherein said positioning means comprises a control rod having a first end and a second end, said first rod end being connected to said control lever second end, and said second rod end being connected by a pivot pin to an additional lever which is rigidly connected to said flap.

13. A truck-type bakery oven in accordance with claim 12, wherein said delay means comprises a slot in said rod first end, said slot comprising means for creating a predetermined backlash in movement of said control lever second end.

14. A truck-type bakery oven in accordance with claim 11, wherein said actuating means includes a main control lever which is adapted to be operated manually, said lever being fulcrumed on a pivot pin.

15. A truck-type bakery oven in accordance with claim 1, wherein said actuating means includes a main control lever which is actuatable by an output shaft of a servomotor.

16. A truck-type bakery oven in accordance with claim 1, wherein said actuating means includes a main control lever having first and second ends, said control lever first end being adapted to selectively open a fresh air drawing valve.

17. A truck-type bakery oven in accordance with claim 16, wherein said control lever is connected to said valve by a cable movable in a flexible sheath, said cable having an upper end and a lower end, said cable upper end being connected to said first end of said main control lever, and said cable lower end adapted to actuate a bell-crank lever which is fulcrumed on a pivot pin and which cooperates with a free end of a shank of said valve.

18. A truck-type bakery oven in accordance with claim 16, wherein said control lever is controlled by a separate servomotor.

19. A truck-type bakery oven in accordance with claim 16, wherein said control lever is operatively connected to said valve by a linkage comprising a plurality of pivotally connected members.

20. A truck-type bakery oven in accordance with claim 16, wherein said control lever is operatively connected to said valve by a hydraulic sheath having a first end and second end, said sheath first end being coupled to said main control lever by a power cylinder, and said sheath second end being coupled to said valve by a slave cylinder.

21. A truck-type bakery oven in accordance with claim 16, wherein said control lever is operatively connected to said valve by means for delaying actuation of said fresh air drawing means until after actuation of said steam exhausting means.

22. A truck-type bakery oven in accordance with claim 21, wherein said means for delaying comprises an additional cable portion attached to an upper end of a cable connecting said valve to said main lever.

23. A truck-type bakery oven in accordance with claim 1, wherein said actuating means include limit-switches.

24. A truck-type bakery oven in accordance with claim 1, wherein said bakery oven comprises a preset timer for controlling said steam exhaust for a predetermined time, and further comprises a locking mechanism for preventing undesired opening of said door.

25. A method of exhausting steam from a bakery oven, said method comprising:
(a) rapidly replacing steam in a baking chamber in a truck-type baking oven with fresh air taken from a surrounding atmosphere, wherein exhaustion of steam from said chamber is coordinated with drawing fresh air into said system; and
(b) initiating replacement of said steam only after a baking process is completed in said chamber, and terminating said replacement after a predetermined time period, said method further comprising indicating the end of a steam replacement period by generating a signal to indicate that a door that controls access to said baking chamber can be safely opened, wherein the volumetric contents of said chamber are replaced by fresh air a plurality of times before said signal is generated.

* * * * *